June 3, 1941. T. H. MAATSCH 2,243,971
RAILROAD SIGNALING DEVICE
Filed Oct. 17, 1938 2 Sheets-Sheet 1

INVENTOR.
Thurlow Maatsch
BY
ATTORNEY.

June 3, 1941.  T. H. MAATSCH  2,243,971

RAILROAD SIGNALING DEVICE

Filed Oct. 17, 1938  2 Sheets-Sheet 2

INVENTOR.
Thurlow Maatsch
BY
ATTORNEY.

Patented June 3, 1941

2,243,971

UNITED STATES PATENT OFFICE 2,243,971

RAILROAD SIGNALING DEVICE

Thurlow H. Maatsch, Flint, Mich.

Application October 17, 1938, Serial No. 235,440

6 Claims. (Cl. 246—125)

This invention relates to a highway safety device and more particularly to an electrical apparatus for signaling the operator of a motor vehicle when he is about to approach a curve in the road, a dangerous intersection or a grade crossing.

An object of the invention is to provide means for automatically signaling the driver when danger is imminent or to positively control the automobile by disengaging the clutch, applying the brakes and/or cutting out the ignition.

Another object of the invention is to protect vehicles and their occupants when approaching railway grade crossings by giving a warning signal inside of the vehicle so that the driver is notified of the danger well in advance of the place where an accident may occur.

A still further object of the invention is to provide a simple, inexpensive, and fool-proof electrical apparatus which is permanently applied to the automobile for positively controlling the operation of the car or to give a visual or audible signal when the car is approaching danger.

Figure 1:
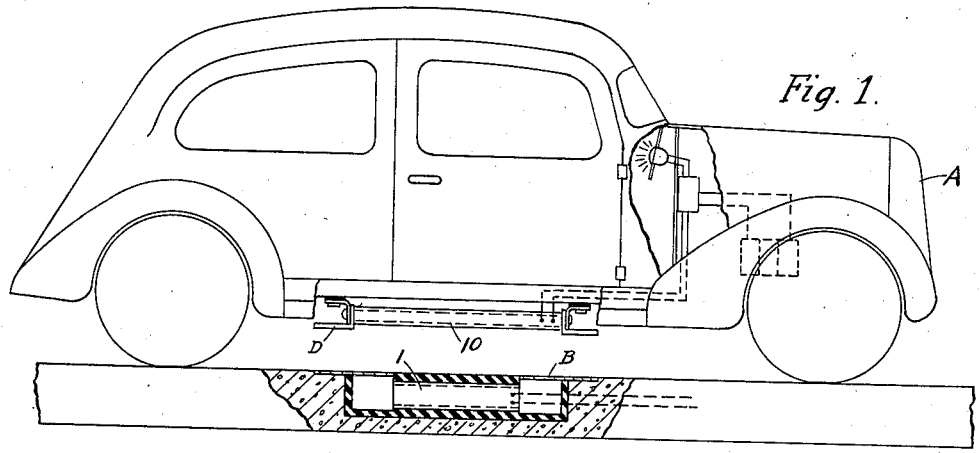
Fig. 1 illustrates the invention applied to an automobile and illustrates the vehicle passing over the road-bed actuator.
Figure 2:
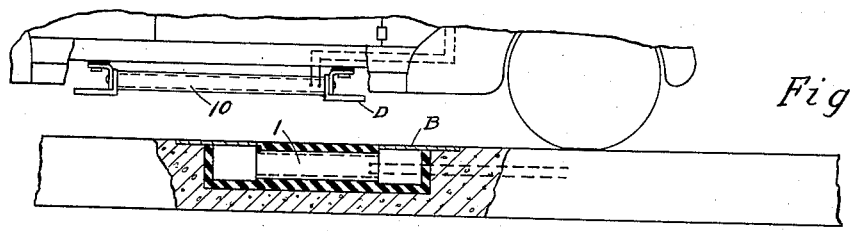
Fig. 2 is a detailed view of the road-bed actuator coil and shows the cooperating coil on the vehicle passing thereover.

As illustrated in the accompanying drawings, the safety signaling or controlling mechanism finds application at any place which is of potential danger to a vehicle travelling along a highway and, to illustrate several of these hazards, the invention is shown as applied to a curved roadway, a highway intersection, and a double track railway grade crossing.

Specifically in the drawings A represents a self-propelled vehicle equipped with the present signaling or controlling invention, while B represents a fixed permanent or electromagnet embedded in the road over which the vehicle is passing. The magnet B is so designed that magnetic lines of force radiate therefrom in an upward direction a sufficient distance to be intersected by the undercarriage of the car.

Electromagnets are preferably employed and an electromagnetic induction pick-up 10 is mounted on the undercarriage of the vehicle so as to come in fairly close relationship with the road magnets B, as the vehicle moves along the highway. The specific construction of the pick-up device and its mounting may be varied, the essential features being that the coil 10 consists of an insulated iron core wound with the proper number of turns of insulated magnet wire to insure its proper sensitivity to the magnetic flux created in the road or field coil 1. It is also preferable to insulate the pick-up device from the metal parts of the vehicle.

Field coils B are energized by a suitable source of A. C. or D. C. current which may be supplied from a convenient power line, or, if this is not available, by a battery. The current supply is denoted by the letter C in the drawings. The field coils per se 1 may be of any suitable size or construction, although they are preferably wound to harmonize with the fixed values of the elements of the apparatus employed in the circuit illustrated in Fig. 3.

The vehicle is equipped with a controlling or signaling device consisting generally of an electrical pick-up device including an induction coil 10 having an insulated iron core 11 over which are wound the requisite number of turns of magnet wire 12. Coil leads 13 are run to a suitable rectifier 14, preferably bridged by condenser 15; the ends of the leads being connected to an electromagnetic relay 16 having a core 17 and winding 18. This arrangement forms a relay which when energized closes the switch 19 to complete the local car battery circuit 20 by contact of the switch blade 19 with fixed contact 21.

A signal lamp or buzzer 22 or controlling mechanism may be mounted on the automobile dashboard or other convenient place to warn the driver when a dangerous condition is imminent.

One side of the lamp or buzzer 22 is grounded to the car frame while the other half of the circuit is connected by conductor 23 to a holding coil 24 which is wound exteriorly of electromagnet 16. The opposite end of the coil winding 24 is connected to a suitable time delay switch 25 whose blade 26 is grounded to the car frame. This time delay switch which may be of any desired type, though illustrated as a thermostatic arm, automatically breaks the local signaling or controlling circuit at the expiration of a suitable time due to passage of a predetermined current therethrough for a definite time interval. During the time lag controlled by the switch 25, the local battery circuit 19—21 continues to energize the electromagnet 16 through the superimposed primary winding 24. The outer coil is wound in such a manner with respect to the direction of the inner coil 16 that the magnet will be energized to properly operate the switch arm. Naturally, when the switch 25 breaks this local circuit, the electromagnet 16 permits the switch 19 to open.

Figure 3:
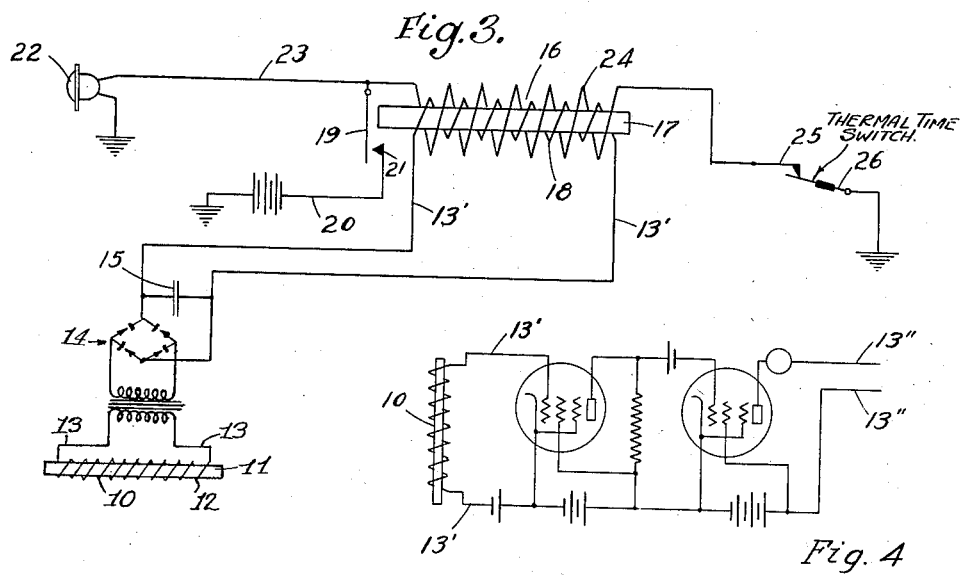
Fig. 3 is a wiring diagram of a circuit capable of carrying out the objects of the invention.
Figure 4:
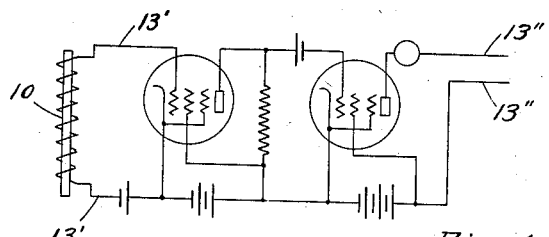
Fig. 4 is a modification of a portion of the electrical circuit wherein thermionic amplifiers are employed.

Fig. 4 illustrates an amplifier circuit for providing sufficient current in the electromagnet 16 to operate the switch 19. In this instance the rectifier and condenser may be eliminated and a two stage resistance coupled amplifier substituted by the use of an A. C. relay (not shown) in place of the D. C. relay shown in Fig. 3. Lead wires 13' connect the ends of pick-up coil 10' to the grid and filament of the first tube of the amplifier and, after mutual amplification, pass the amplified current through the second tube and then to outlet leads 13" connected to relay 16.

Figure 5:
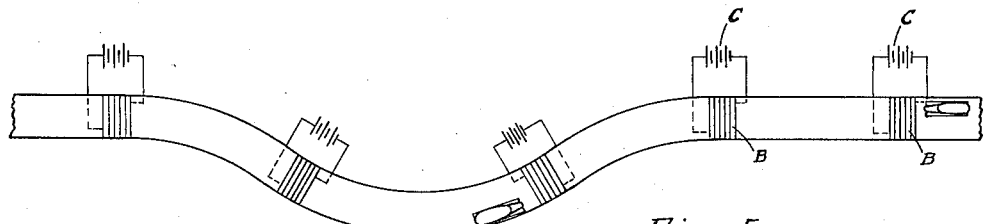
Fig. 5 is a diagrammatic layout of the magnetic actuators applied to a curved road.

In Fig. 5 a series of field magnets B are shown at strategic points in a curved roadway. While the magnets B are shown as electromagnets, suitable permanent magnets may be employed where practical. Each series of field magnets extends across the road-bed and, according to the foregoing description, the vehicle in passing over the series of magnets causes a visual or audible signal to the driver of the car as he approaches and traverses a dangerous curve in the highway.

Figure 6:
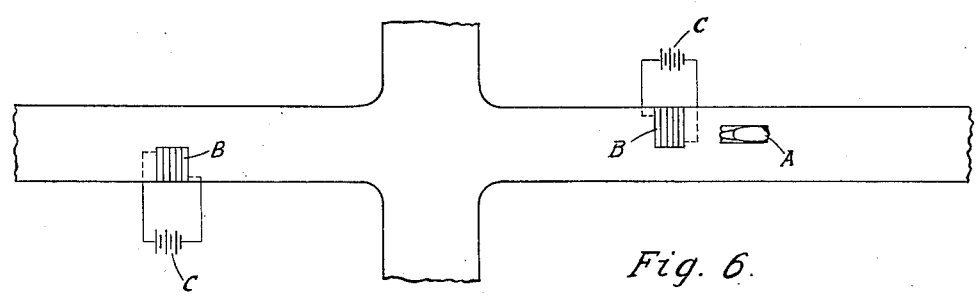
Fig. 6 is a similar layout of the magnets placed in a road-bed on opposite sides of an intersection.

Fig. 6 illustrates the invention and the arrangement of the field magnets on opposite sides of an intersection. Here the field magnets extend only half way across the highway at a suitable distance on either side of the intersection so that, as the driver approaches the intersection, a light or buzzer is operated to remind him that he is reaching the intersection and should proceed cautiously.

Figure 7:
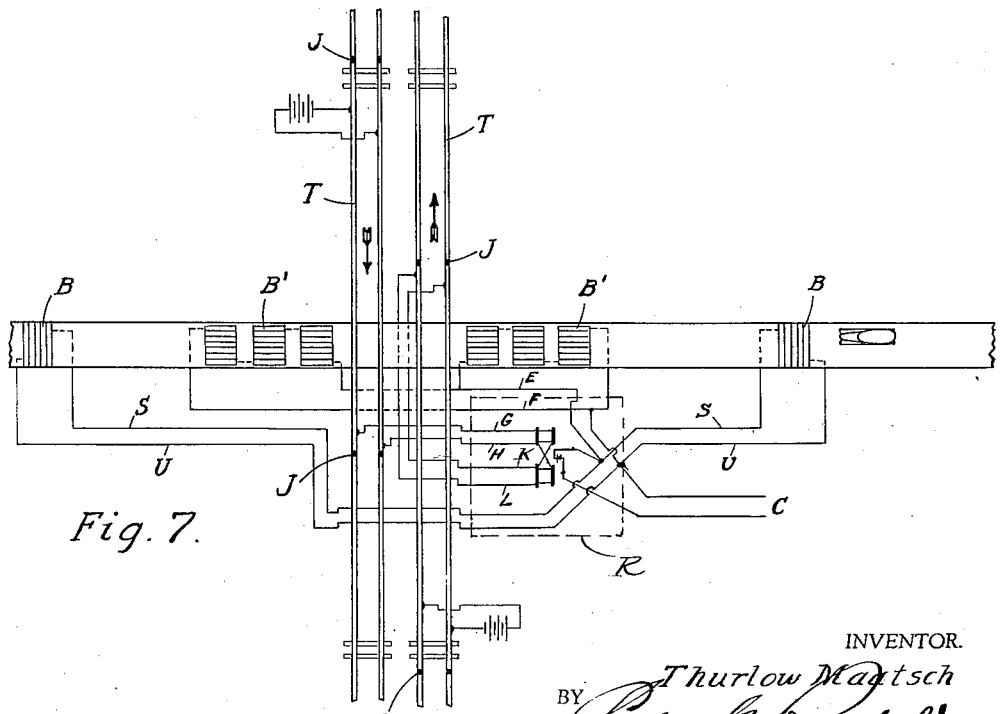
Fig. 7 is a schematic layout of the invention applied at a railway grade crossing.

One of the most important aspects of the invention is shown in Fig. 7 in connection with a double track grade crossing. Transverse field coils B are placed across the roadway at a substantial distance from the tracks T and connected to the track relay casing R by conductors S and U to provide an initial warning to the driver of the vehicle that a danger zone exists when a single train is approaching the crossing. This is accomplished by contacts being established by the approaching train to de-energize the track relay control for the magnets B. Adjacent the tracks and extending longitudinally of the highway on either side thereof, a bank of field coils B' is imbedded in the highway and connected to the tracks through conductors E and F, interlocking relay R and conductors GH and KL respectively. These conductors are in turn connected to the source of electrical energy C through the track relay R. As clearly illustrated in Fig. 7, the conductors E and F, being in electrical contact with both tracks through the track relay R, two trains at or near the crossing will energize both banks of field coils B'. Such an arrangement insures that a vehicle moving from right to left will be warned of a train moving in the direction of the arrow on the right hand track through the magnet B and, if a second train is approaching on the other track and in the opposite direction, the field coils B' will be energized to warn the driver that it is not safe to proceed.

As before pointed out, the present invention contemplates not only the sound of an audible alarm or energizing a visual signal lamp interiorly of the vehicle, but also the opening of the ignition, disengaging the clutch, and applying the brakes of the vehicle through the medium of the electromagnetic relay 16. As is well known in the prior art and for simplicity of illustration, the relay 16 has been shown energizing a signal lamp 22, but the same electrical impulse which is created by closing the switch 19 could be very simply arranged to positively control and stop the vehicle without departing from the spirit of the invention.

In operation the induction coil 10 fitted to the undercarriage of the automobile cuts the lines of force generated by the field magnets B as it passes thereover as will be well understood by those skilled in the art, and the induced current will flow in circuits 13 through the rectifier 14 to smooth out pulsations. The rectifier receives the current impulse of irregular wave form in its input circuit 13 and converts this energy into a direct current impulse which thereupon flows in the rectifier output circuit 13' to the inner winding or pickup coil 18 of the relay 16, thereby magnetizing the core 17 and drawing the armature 19 to the right as shown in Fig. 3. The movement of the armature or switch blade 19 closes its contact 21 to complete the local battery circuit 20 through circuit 23 to the alarm device 22.

The time delay switch 25 is normally closed, and thus it will be seen that the current from the battery 29 will flow through outer winding 24 and through switch arm 26 to ground and will be limited by the effective resistance of coil 24 and the remainder of this series circuit. As soon as the time switch 25 has operated by breaking the circuit through arm 26, the apparatus will be restored to its normal position and signaling device 22 de-energized.

While the rectifier 14 and bridge condenser 15 are not essential to the successful operation of the circuit, it has been found that they produce a much more stable operation of the relay 16 than is obtained when the application of the induced current is connected directly from the pick-up coil 12.

What is claimed and desired to be secured by Letters Patent is:

1. In a highway crossing, in combination with track rails, an electro-magnetic circuit including an electromagnet embedded in the highway a distance from the track rails; an alternating current source for said electromagnet in electrical circuit with said track rails; means controlled by the presence of a car on said track rails within a predetermined distance from said crossing for completing the circuit to said electromagnet; a vehicle; an electrical pick-up circuit carried by the vehicle and arranged to cooperate with electromagnetic lines of force emanating from the embedded electromagnet; an electrical relay adapted to receive energy from said pick-up circuit; a first circuit comprising in series a warning signal, local battery means, and switch means operable by said electrical relay; and a second circuit comprising in series the said warning signal, a holding winding for said electrical relay, and a normally closed time delay switch; whereby the warning signal will be energized initially by the action of the pick-up circuit in operating the electrical relay to close the switch means of the first circuit, and maintained in an energized condition until the time delay switch opens to release the switch means of the first circuit.

2. In combination with a vehicle, an electrical pick-up device including an induction coil adapted to be passed through a magnetic field; an electrical relay connected to and receiving energy from said induction coil; a condenser and a rectifier bridging the connections between the induction coil and relay; a first circuit comprising in series a warning signal, local battery means, and switch means operable by said electrical relay; and a second circuit comprising in series the said warning signal, a holding winding for said electrical relay, and a normally closed time delay switch; whereby the warning signal will be energized initially by the action of the pick-up circuit in operating the electrical relay to close the switch means of the first circuit, and maintained in an energized condition until the time delay switch opens to release the switch means of the first circuit.

3. In combination with a vehicle, an electrical energy pick-up including an induction coil adapted to be passed through an electro-magnetic field; a thermionic current amplifier connected to said induction coil; an electrical relay receiving amplified energy from said thermionic amplifier; a first circuit comprising in series a warning signal, local battery means, and switch means operable by said electrical relay; and a second circuit comprising in series the said warning signal, a holding winding for said electrical relay, and a normally closed time delay switch; whereby the warning signal will be energized initially by the action of the pick-up circuit in operating the electrical relay to close the switch means of the first circuit, and maintained in an energized condition until the time delay switch opens to release the switch means of the first circuit.

4. In combination with a vehicle, an electrical pick-up device including an induction coil adapted to be passed through a magnetic field; a relay connected to and receiving energy from said induction coil, a switch adapted to be operated by said relay; a first circuit comprising in series a warning signal, local battery means, and switch means operable by said electrical relay; and a second circuit comprising in series the said warning signal, a holding winding for said electrical relay, and a normally closed time delay switch; whereby the warning signal will be energized initially by the action of the pick-up circuit in operating the electrical relay to close the switch means of the first circuit and maintained in an energized condition until the time delay switch opens to release the switch means of the first circuit.

5. In combination with a vehicle, an electrical pick-up circuit capable of receiving and translating magnetic induction currents and including an iron core carrying a winding; an electrical relay comprising a core and a winding adapted to receive energy from said pick-up circuit; a first circuit comprising in series an electrical alarm, local battery means, and switch means operable by said electrical relay; and a second circuit comprising in series the said electrical alarm, an additional winding overlying the core and windings of the electrical relay, and a normally closed time delay switch; whereby the electrical alarm will be energized initially by the action of the pick-up circuit in operating the electrical relay to close the switch means of the first circuit, and maintained in an energized condition until the time delay switch opens to release the switch means of the first circuit.

6. A highway safety system comprising, in combination, a series of local sources of electromagnetic force positioned in the surface of the highway adjacent potentially dangerous locations thereon; and a vehicle for traversing said highway, said vehicle being equipped with an induction coil so positioned thereon as to cut the lines of electromagnetic force emanating from the local sources in the highway; a relay in electrical circuit with the induction coil; a first circuit comprising in series a warning signal, local battery means, and switch means operable by said electrical relay; and a second circuit comprising in series the said warning signal, a holding winding for said electrical relay, and a normally closed thermal time delay switch; whereby the warning signal will be energized initially by the action of the pick-up circuit in operating the electrical relay to close the switch means of the first circuit, and maintained in an energized condition until the time delay switch opens to release the switch means of the first circuit.

THURLOW H. MAATSCH.